(12) United States Patent
Chaiken et al.

(10) Patent No.: US 11,429,288 B1
(45) Date of Patent: Aug. 30, 2022

(54) SYSTEM AND METHOD TO SECURE PORTS ON A COMPUTER

(71) Applicant: Dell Products L.P., Round Rock, TX (US)

(72) Inventors: Craig Lawrence Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 17/184,641

(22) Filed: Feb. 25, 2021

(51) Int. Cl.
*G06F 3/06* (2006.01)
*G06F 13/40* (2006.01)

(52) U.S. Cl.
CPC .......... *G06F 3/0619* (2013.01); *G06F 3/067* (2013.01); *G06F 3/0629* (2013.01); *G06F 13/4081* (2013.01)

(58) Field of Classification Search
CPC ...... G06F 3/0619; G06F 3/0629; G06F 3/067; G06F 13/4081; G06F 2213/0042
See application file for complete search history.

(56) References Cited

U.S. PATENT DOCUMENTS

| | | | | |
|---|---|---|---|---|
| 8,769,173 | B2* | 7/2014 | Cardinell | G06F 11/3034 710/16 |
| 8,913,683 | B2* | 12/2014 | Nammi | H04B 7/0486 375/267 |
| 10,235,195 | B2* | 3/2019 | Iyer | G06F 9/45533 |
| 10,699,013 | B2* | 6/2020 | Warpinski | G06F 21/57 |
| 10,719,468 | B2* | 7/2020 | Takezawa | G06F 13/382 |
| 2007/0124413 | A1* | 5/2007 | Diab | H04L 9/3236 709/217 |
| 2016/0373408 | A1* | 12/2016 | Wentworth | G06F 21/445 |
| 2017/0063552 | A1* | 3/2017 | Abt, Jr. | H04L 63/0407 |
| 2017/0093896 | A1* | 3/2017 | Poornachandran | G06F 21/575 |
| 2018/0097629 | A1* | 4/2018 | Soffer | G06F 13/105 |
| 2018/0165455 | A1* | 6/2018 | Liguori | G06F 21/575 |
| 2018/0365397 | A1* | 12/2018 | Viscarola | G06F 21/45 |
| 2022/0092011 | A1* | 3/2022 | Jin | G06F 21/85 |

OTHER PUBLICATIONS

Dell Trusted Device Below the OS Whitepaper—"Client Solutions Dell Trusted Device: BIOS Security"; 30 Pages, Dated Sep. 2020 (Year: 2020).*

* cited by examiner

*Primary Examiner* — Brian T Misiura
(74) *Attorney, Agent, or Firm* — Terrile, Cannatti & Chambers, LLP; Emmanuel A. Rivera (57) ABSTRACT

A system, method, and computer-readable medium are disclosed for securing hot-pluggable ports, such as USB ports, of an information handling system, by isolating a dedicated controller from the operating system of the information handling system. Devices that are to be allowed to be enabled at the ports are determined. A hash signature is created and saved to verify the devices. The controller and ports are held in reset until the devices are authenticated.

17 Claims, 8 Drawing Sheets

SYSTEM AND METHOD TO SECURE PORTS ON A COMPUTER

BACKGROUND OF THE INVENTION

Field of the Invention

The present invention relates to the management of information handling systems. More specifically, embodiments of the invention provide a system, method, and computer-readable medium for improved security of hot-pluggable ports, such as universal serial bus (USB) ports, on a computer.

Description of the Related Art

Information handling systems, such as laptop computers, typically implement hot-pluggable ports, such as universal serial bus (USB) ports to connect with external devices. External devices can provide for read and write access to the information handling system. Examples of external devices include optical drives, webcams, USB thumb drives, peripheral component interconnect (PCI) devices, 1394/FireWire devices, etc.

As the form factor becomes thinner for such information handling systems (e.g., laptop computers), such hot-pluggable are relied more to provide connectivity to external devices for functionality that is not available on the information handling system. For example, optical compact disc (CD) drives may not be available on a thin form factor laptop. Therefore, a port connection (e.g., USB) can be provided to an external optical CD drive.

In general, hot-pluggable ports, such as USB ports, support all classes of devices. Security risks arise from the ability of any device to connect through a hot-pluggable port. In instances, when the desire is to protect data on information handling devices to be accessed, or to prevent access to a hot-pluggable device, an information handling system's basic input output system or BIOS can setup to disable all hot-pluggable ports. This approach disables devices that are not desired; however, devices that are desired or may be needed to have hot-pluggable connection are also disabled.

SUMMARY OF THE INVENTION

A system, method, and computer-readable medium are disclosed for securing hot-pluggable ports, such as USB ports, of an information handling system, by isolating a dedicated controller from the operating system of the information handling system. Devices that are to be allowed to be enabled at the ports are determined. A hash signature is created and saved to verify the devices. The controller and ports are held in reset until the devices are authenticated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for securing hot-pluggable ports, such as universal serial bus (USB) ports, as to different devices that connect to a computer (information handling device). In various implementations, where an existing architecture provides for integrated USB ports, the embedded USB controller is disabled and isolated from the operating system (OS). A dedicated USB controller that can be isolated from the OS is added, such as on a motherboard or expansion card.

Implementations provide for the dedicated USB controller to be held in reset to isolate the dedicated USB controller from the OS. The USB ports can be wired, such that device plug and unplug events generate a basic input output system (BIOS) system management interrupt (SMI) event. When a SMI event occurs, the BIOS can validate a device before the OS accesses the device. Implementations provide that the BIOS allows only certain device types and class codes. For example, a CD-ROM device is allowed, but a CD-RW device is blocked. Various implementations can provide for an information technology (IT) manager/administrator to limit support to a very specific set of authenticated devices. Implementations can include providing support for a new USB device, by reading a hash signature for the device from a storage (e.g., hard disk) file, which is copied to NVRAM from BIOS Setup.

Implementations provide that a reset signal for the dedicated USB controller is controlled by a General-Purpose Output signal. This reset signal stays asserted until a USB device is plugged into one of the USB ports configured to the dedicated USB controller. Each USB port can be connected to a General-Purpose Output pin that allows the USB device to be electrically disconnected when asserted. A device connect signal on each port of the dedicated USB controller is connected to a General-Purpose Input signal programmed to generate a SMI event when a USB device connect or disconnect occurs.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
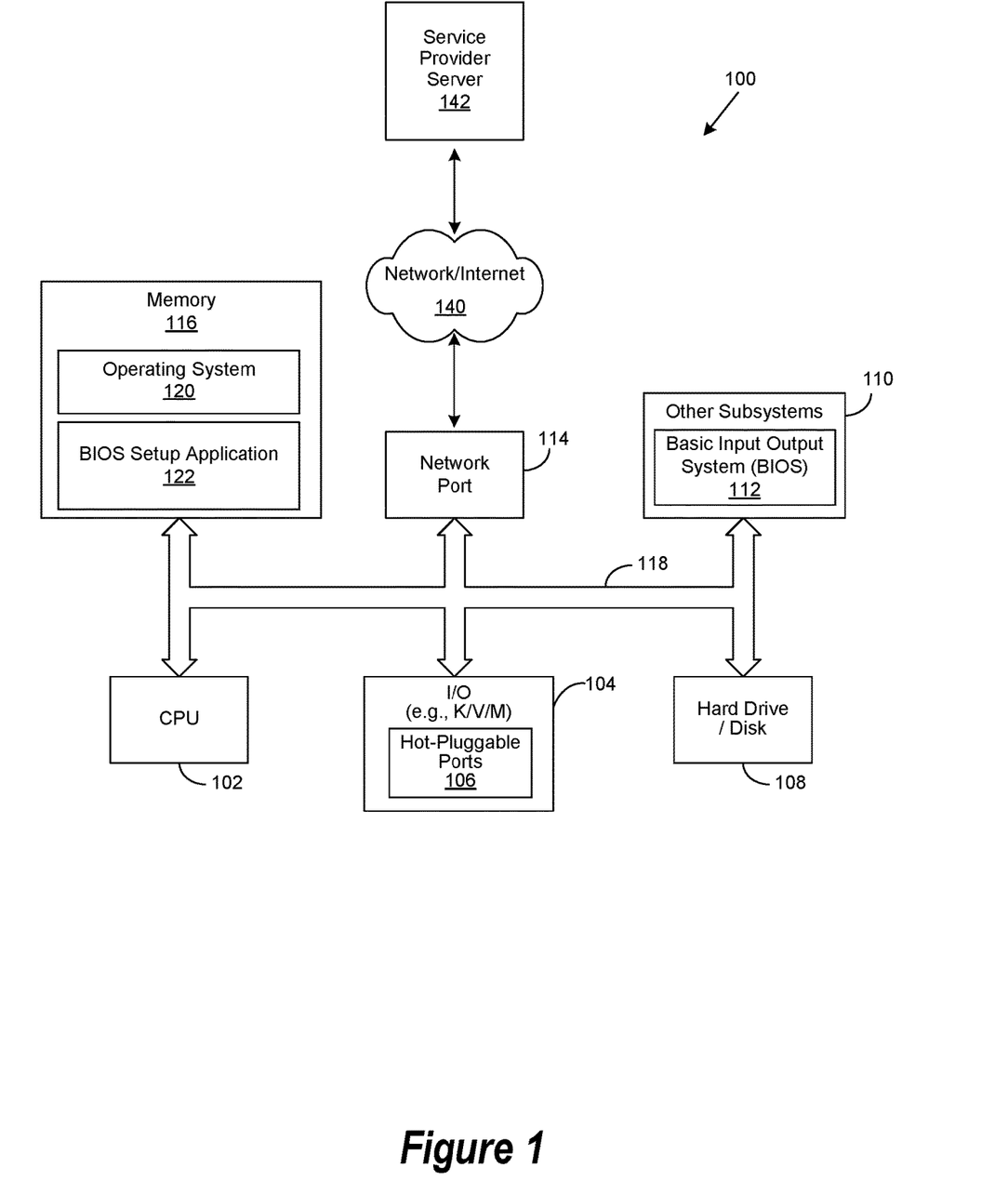
FIG. 1 is a general illustration of components of an information handling system.

FIG. 1 is a generalized illustration of an information handling system 100 that can be used to implement the system and method of the present invention. Examples of information handling system 100 include various computing devices, such as desktop and laptop computers.

The information handling system 100 includes a processor (e.g., central processor unit or "CPU") 102, input/output (I/O) devices 104, such as a microphone, a keyboard, a video/display, a mouse, and associated controllers (e.g., K/V/M) which can include hot-pluggable ports, such as USB ports.

Information handling system 100 further can include a hard drive or disk storage 108, and various other subsystems 110. Other subsystems 108 can include a basic input output system (BIOS) 112. In certain implementations, BIOS 112 is firmware. BIOS 112 is used to perform a POST (power-on self-test) to identify and initialize key system components (CPU, RAM, GPU, storage, DMA controllers, etc.), perform hardware initialization during an operating system boot up operation, and provides runtime services for operating systems and programs. It is to be understood that evolving technology, such as Unified Extensible Firmware Interface (UEFI) may be used in place of BIOS 112.

In various embodiments, the information handling system 100 also includes network port 114 operable to connect to a network/internet 140, which is likewise accessible by a service provider server 142. The network/internet 140 can include may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 116, which can include nonvolatile read access memory (NVRAM) and other memory. System memory 116 can be interconnected to the foregoing via one or more buses 118. System memory 112 further comprises operating system (OS) 120 and in various embodiments may also include BIOS setup application 122.

Figure 2:
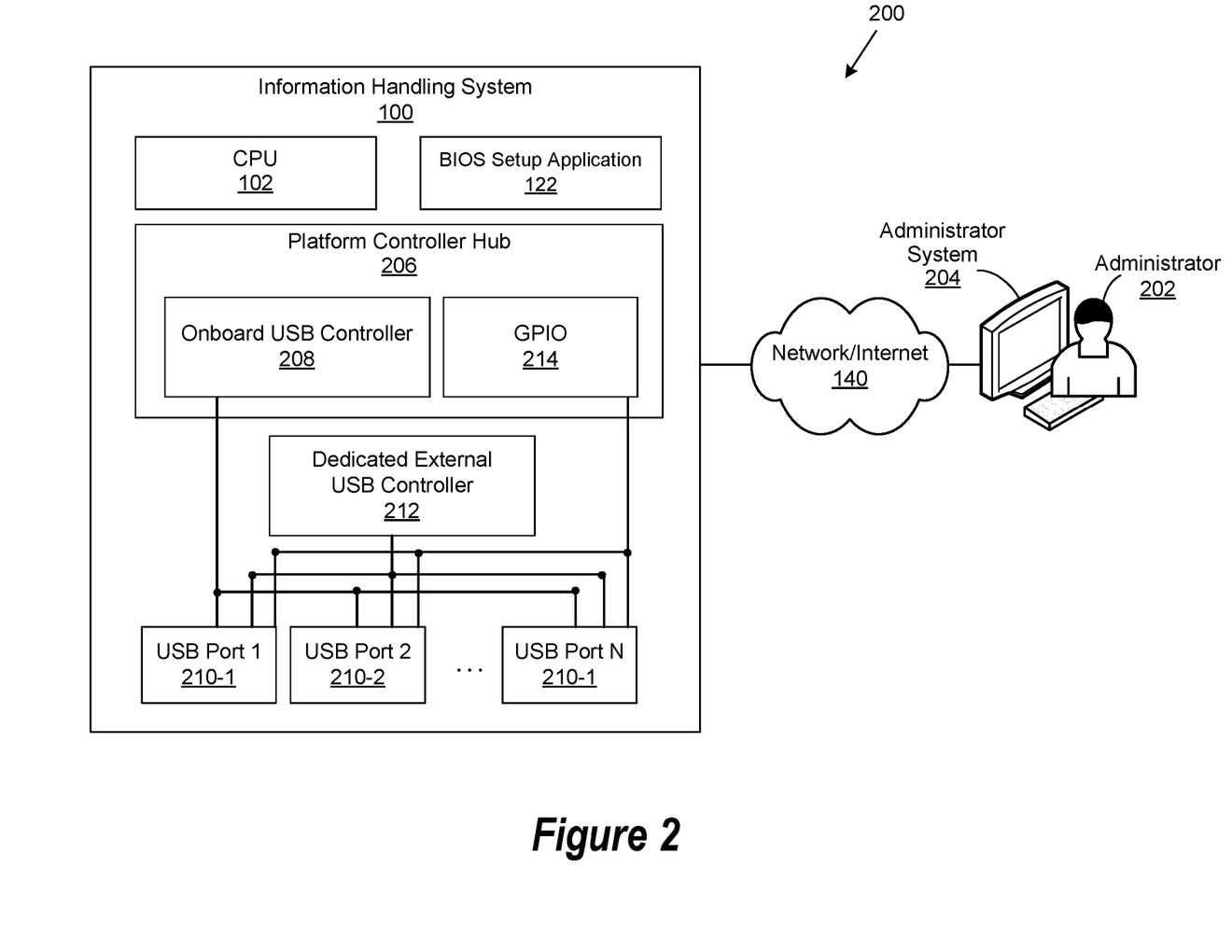
FIG. 2 is a simplified block diagram of a system for configuring security of hot-pluggable ports of an information handling system.

FIG. 2 is a simplified block diagram of a system 200 for system for configuring security of hot-pluggable ports of information handling system 100. In various implementations, an administrator 202 through an administrator system 204 and network 140 accesses the information handling system 100. In particular, the administrator system accesses the BIOS setup application 122. As further discussed, implementations can provide for the BIOS setup application 122 to provide a user, such as an IT manager, as represented by administrator 202 a menu when BIOS setup application 122 enters an administration or "admin mode".

Various embodiments provide for the information handling system 100 to include a platform controller hub (PCH) 206. Certain embodiments of the PCH 206 include a pre-existing onboard USB controller 208 which may be part of a chipset that includes connectivity to one or more hot-pluggable USB port 1 210-1, USB port 2 210-2 to USB port N 210-N. Implementations provide for the onboard USB controller 208 and connection to the USB ports 210 to be disabled.

In various embodiments, a dedicated external USB controller 212 is added and replaces functionality of the onboard USB controller 208. Implementations include adding the dedicated external USB controller 212 on a motherboard or expansion card of the information handling system 100. The dedicated external USB controller 212 is held in reset and isolated from the operating system 120. The USB ports 210 can be wired, such that device plug and unplug events generate a BIOS SMI event. When a SMI event occurs, the BIOS can validate a device before the operating system 120 accesses the device. Implementations provide that the BIOS 112 allows only certain device types and class codes. For example, a CD-ROM device is allowed, but a CD-RW device is blocked.

Embodiments provide for general purpose input and output signals or GPIO 214. Implementations provide for the GPIO 214 to include a reset signal to the dedicated external USB controller 212. A pair of port reset and SMI signals is provided to the USB ports 210. GPIO 214 signals are further described herein.

Figure 3:
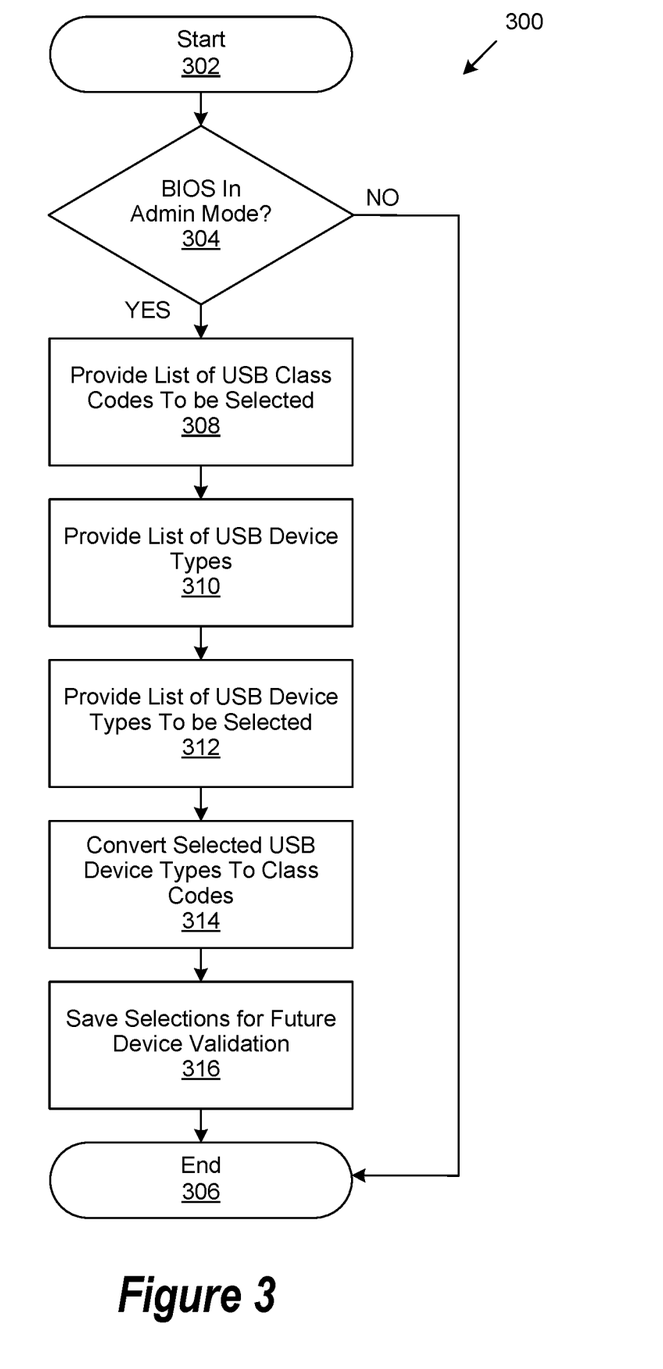
FIG. 3 shows a flowchart of an example scenario of a basic input output system (BIOS) setup to select supported universal serial bus (USB) device types or USB device class codes.

FIG. 3 shows a flowchart 300 of an example scenario for BIOS setup to select supported USB device types or USB device class codes. The flowchart 300 illustrates one scenario; however, it is to be understood that other scenarios are possible. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 302, the process 300 starts. At step 304, a determination is performed as to administration or admin mode. Implementations provide for a menu to be presented to a user, or IT manager, for example administrator 202. If not in admin mode, following the "NO" branch of step 304, at step 306, the process 300 ends.

Otherwise, if in admin mode, following the "YES" branch of step 304, at step 308, a list of USB class codes are provided to be selected from. When BIOS setup is entered in admin mode, the user can be provided with a list of USB major class code check boxes. If the user selects a major class code, a popup menu allows the user to either select all minor class codes, or one or more specific class codes.

At step 310, a list of USB device types is provided. Examples of common USB device types can include CD-ROM drives, camera, keyboard, mouse, speaker, etc. For example, there can be "base class" that can be divided into a "sub class." The "sub class" can be further divided to "protocol." For example, base class: 00—device; 01—interface (audio); 02—device/interface (communication); 03—interface (HID device class); 05—interface (physical device class); 06—interface (still imaging Device); 07—interface (printer device); 08—interface (mass storage device).

At step 312, a list of USB device types to be selected is provided. At step 314, selected USB device types are converted to class codes. The conversion can be performed by the BIOS setup.

At step 316, the selections are saved for future device validation. Implementations provide for such selections/settings to be saved to NVRAM for use when validating whether a device will be visible to the operating system 120. At step 306, the process ends.

Figure 4:
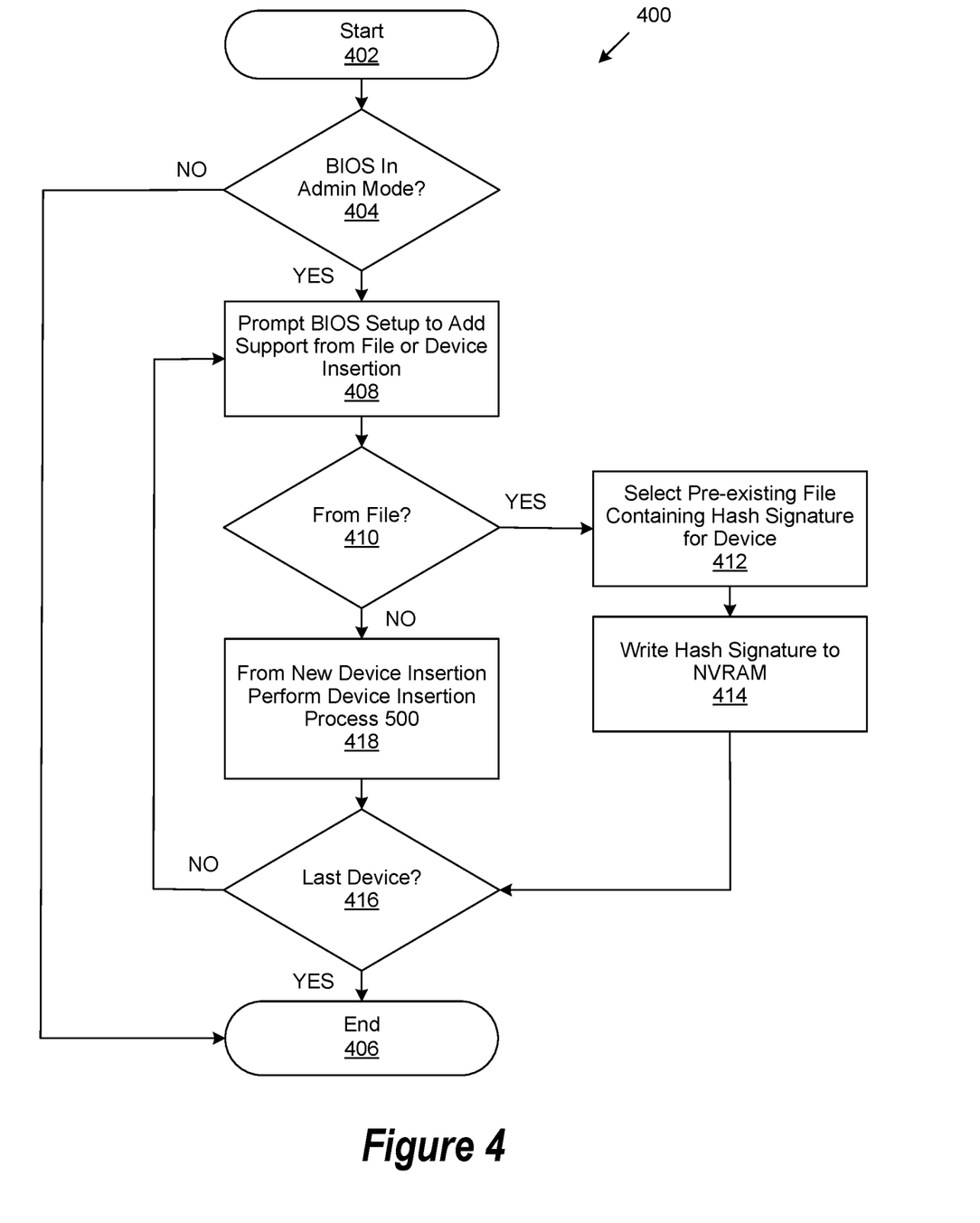
FIG. 4 shows a flowchart of an example scenario of a basic input output system (BIOS) setup to add support for universal serial bus (USB) devices.

FIG. 4 shows a flowchart 400 of an example scenario for BIOS setup to add support for USB devices. The flowchart 400 illustrates one scenario; however, it is to be understood that other scenarios are possible. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 402, the process 400 starts. At step 404, a determination is performed as to admin mode. Implementations provide for a menu to be presented to a user, or IT manager, for example administrator 202. If not in admin mode, following the "NO" branch of step 404, at step 406, the process 400 ends.

Otherwise, if in admin mode, following the "YES" branch of step 404, at step 408, a prompt is made to the BIOS setup to add support from either a file or from device insertion. When BIOS setup is entered in admin mode, the user can be provided with a list of USB major class code check boxes. If the user selects a major class code, a popup menu allows the user to either select all minor class codes, or one or more specific class codes.

At step 410, a determination is performed if support is from a file. If the support is from a file, following the "YES" branch of step 410, at step 412, a pre-existing file that contains a hash signature for the device is selected. The user selects "from a file", selecting a pre-existing file containing a hash signature for the device. The pre-existing file may be stored in a drive, such as a hard disk drive (HDD) in the information handling system.

At step 414 in certain implementations, the hash signature is written to NVRAM. At step, 416 a determination is performed whether if the other devices are to be added for support. If the device is the "last device," then following the "YES" branch of step 416, at step 406, the process ends.

Figure 5:
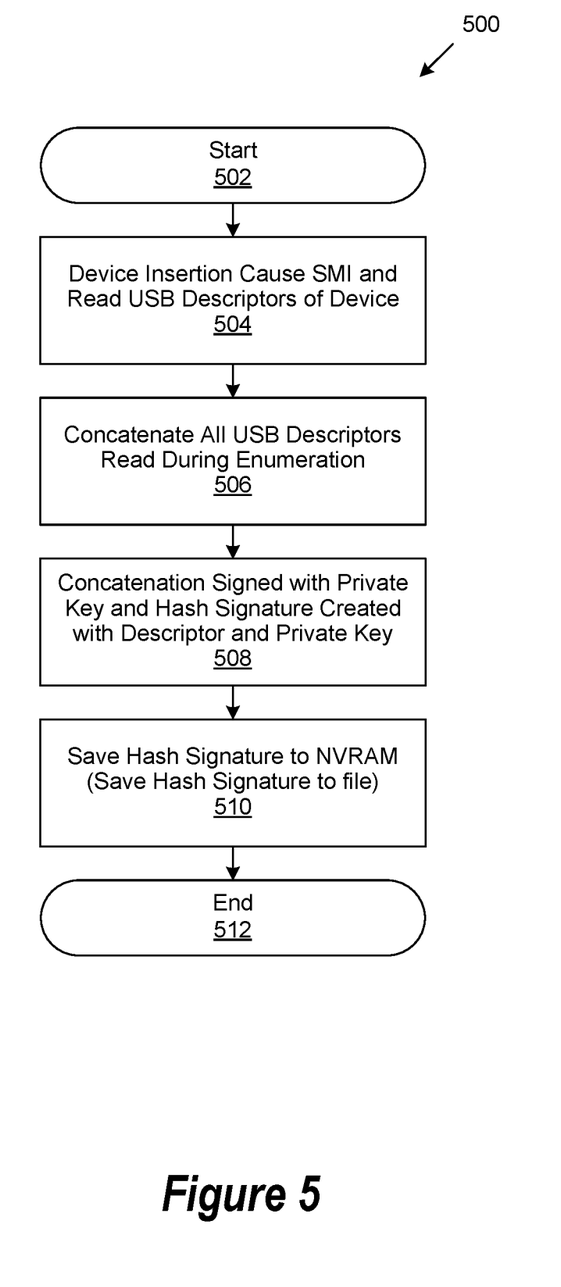
FIG. 5 shows a flowchart of an example scenario of insertion of universal serial bus (USB) devices to add support for USB devices.

If the support is not from a file, then following the "NO" branch of step 410, at step 418, support is from new device insertion, and device insertion process 500 described below is performed. At step, 416 a determination is performed whether if the other devices are to be added for support. If the device is the "last device," then following the "YES" branch of step 416, at step 406, the process ends.

FIG. 5 shows a flowchart 500 of an example scenario of insertion of USB devices to add support for USB devices. In particular, process 500 describes steps performed as to step 418 of process 400. The flowchart 500 illustrates one scenario; however, it is to be understood that other scenarios are possible. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 502, the process 500 starts. At step 504, insertion of a device will cause a system management interrupt or SMI. System management mode or SMM is entered when the SMI occurs. SMM code, and particularly a SMI handler, enumerates the device and returns a hash signature of all USB descriptors of the device.

At step 506, a concatenation of all USB descriptors is performed. The hash signature will include concatenation of all USB descriptors read during enumeration. At block 508, the concatenation is signed with a private key, and the hash signature is created with the descriptors and the private key.

At step 510, the hash signature can be saved to NVRAM. BIOS setup can also save the hash signature to a file for other information handling systems (i.e., computers) to use for new device insertion. At step 512, the process 500 ends.

Figure 6:
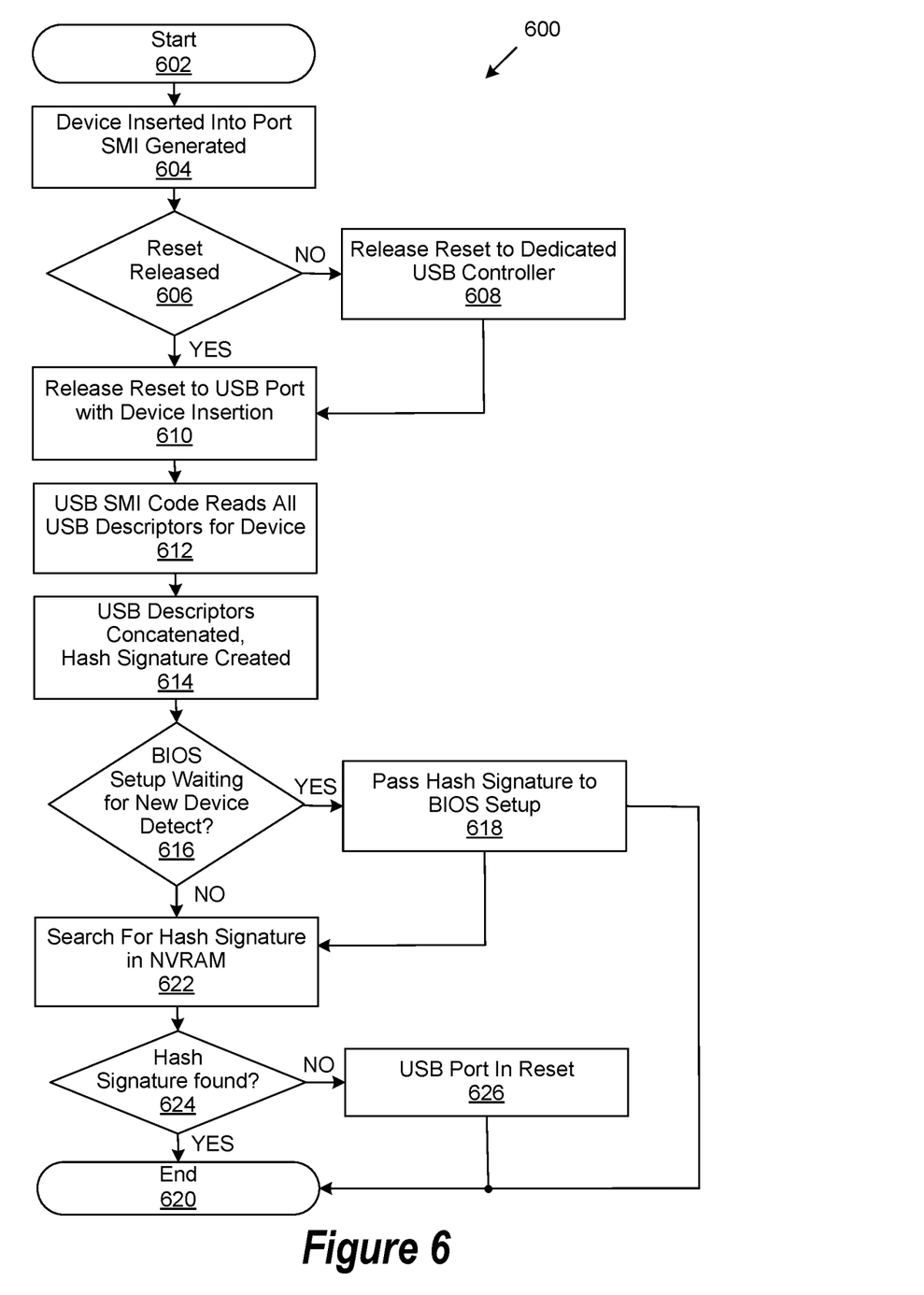
FIG. 6 shows a flowchart of an example scenario of dedicated universal serial bus (USB) port insertion event.

FIG. 6 shows a flowchart 600 of an example scenario of dedicated USB port insertion event. The flowchart 600 illustrates one scenario; however, it is to be understood that other scenarios are possible. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 602, the process 600 starts. At step 604, insertion of a device into a port configured to the dedicated external USB controller 212, a general purpose input signal from the GPIO 214 signals generates a SMI.

At step 606, a determination is performed as to the reset signal to the USB port. Determination can be performed by the SMI handler. If the port is not released, following the "NO" branch of step 606, at step 608, the SMI handler releases reset to dedicated external USB controller 212. If the reset is released, following the "YES" branch of step 606, at step 610, the SMI handler releases to the USB port upon device insertion.

At step 612, all USB descriptors are read by the USM SMI code. At step 614, USB descriptors are concatenated. Implementations provide for a hash signature to be created with a private key. The hash signature can be a 256 byte hash signature.

At step 616, a determination is performed as to whether BIOS setup is waiting for a new device to be selected. If a new device is to be selected, following the "YES" branch of step 616, at step 618 the hash signature is passed to BIOS setup. At step 620, the process 600 ends.

If the BIOS setup is not waiting for a new device to be selected, following the "NO" branch of step 616, at step 622, the SMI handler searches for the hash signature in NVRAM. At step 624, a determination is performed whether the hash signature is found. If the hash signature is found, the SMI handler is exited and the operating system 120 can now see the USB device. Following the "YES" branch of step 624, at step 620, the process 600 ends.

If the hash signature is not found, following the "NO" branch of step 624, at step 626, the USB port is placed in reset again. At step 620, the process ends.

In various implementations, a similar flow as to steps 616 to step 620 can be performed to check for USB device class code support, where USB descriptors are parsed to identify the USB class code. The SMI handler searches NVRAM for the USB class code being supported. If the class code is found, the SMI handler will exit and the operating system 120 can see the USB device. If the class code is not found, the USB port will be put into reset again.

Figure 7:
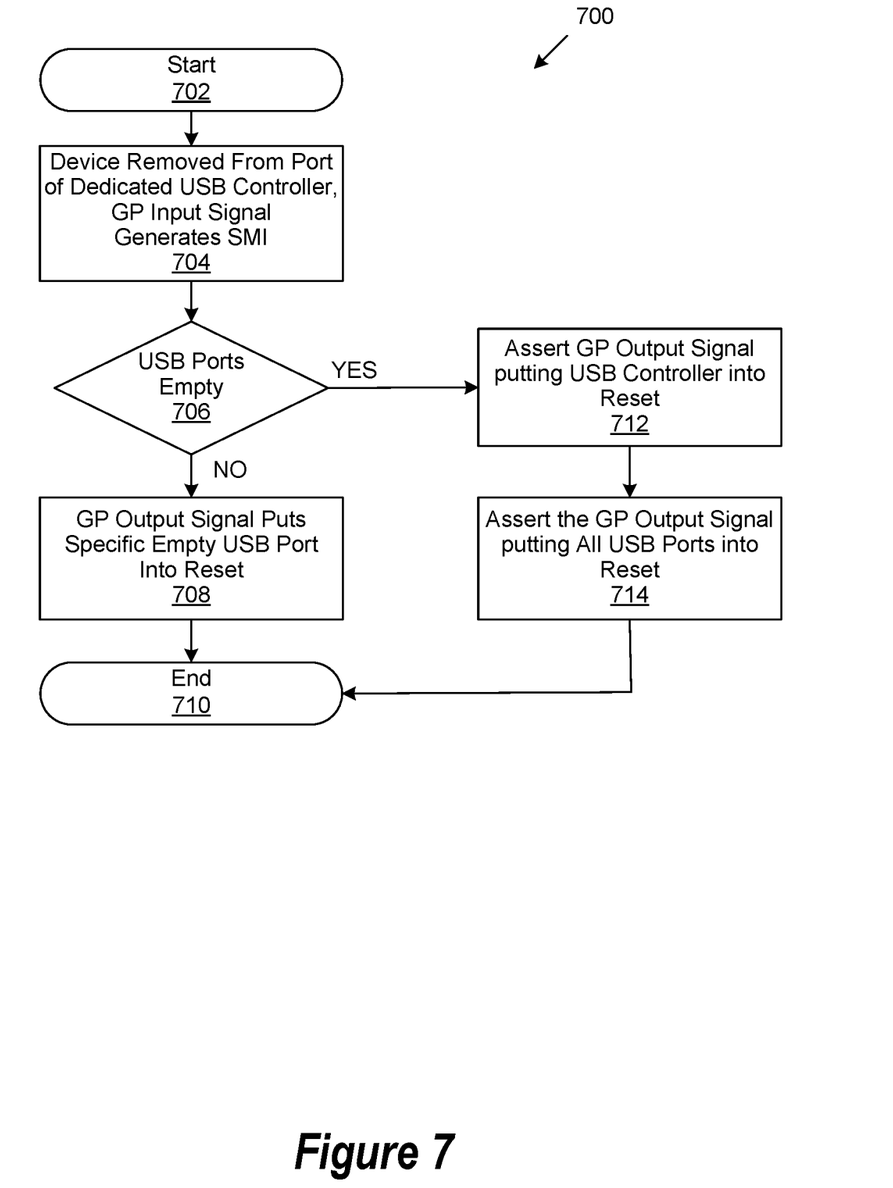
FIG. 7 shows a flowchart of an example scenario of dedicated universal serial bus (USB) port removal event.

FIG. 7 shows a flowchart 700 of an example scenario of dedicated USB port removal event. The flowchart 700 illustrates one scenario; however, it is to be understood that other scenarios are possible. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 702, the process 700 starts. At step 704, a USB device is removed from a USB port that is configured to the dedicated external USB controller 212. A general purpose input signal from the GPIO 214 signals generates a SMI.

At step 706, a determination is performed whether the USB ports are empty. Determination can be performed by the SMI handler. If the USB ports are not empty, following the "NO" branch of step 706, at step 708, an output signal from the GPIO 214 signals places the specific empty USB port into reset. At step 710, the process 700 ends.

If the USB ports are empty, following the "YES" branch of step 706, at step 712, an output signal from GPIO 214 signals is asserted that places the dedicated external USB controller 212 into reset. At step 714, an output signal from GPIO 214 signals is asserted that places all USB ports into reset. At step 710, the process 700 ends.

Figure 8:
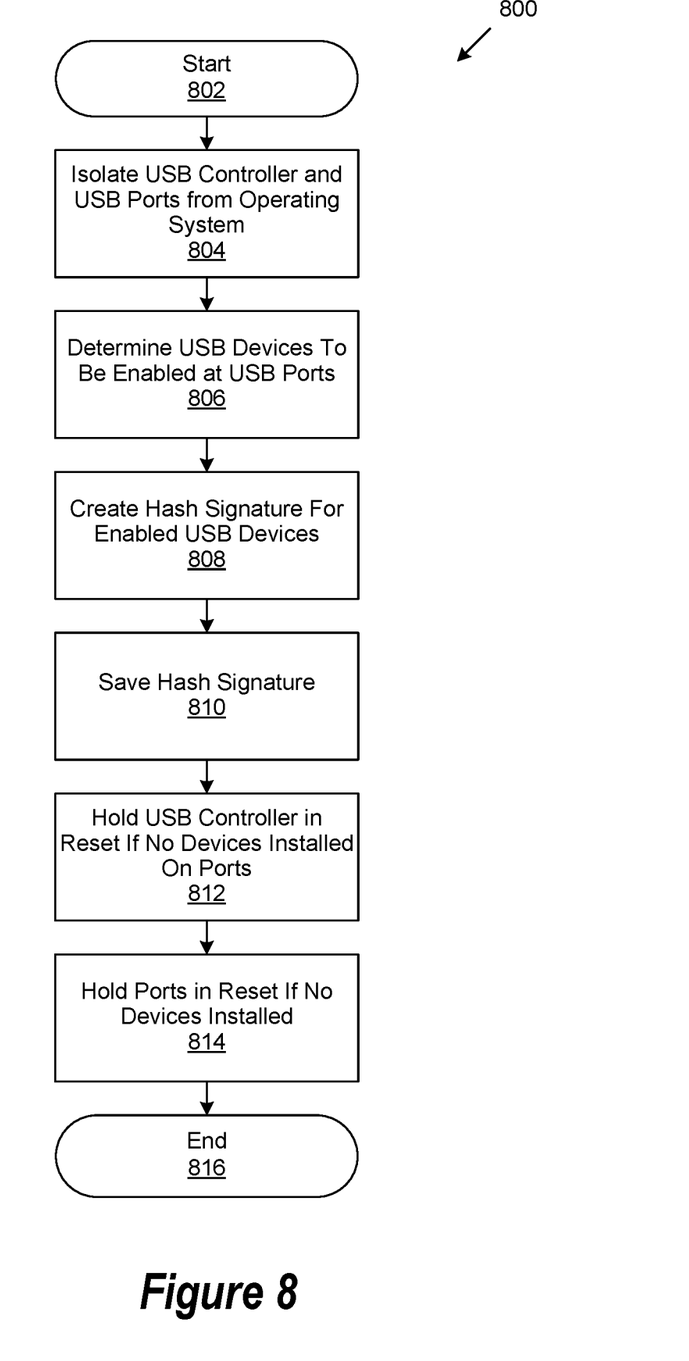
FIG. 8 shows a flowchart of an example process for securing hot-pluggable ports, such as universal serial bus (USB) ports.

FIG. 8 is a generalized flowchart 800 for securing hot-pluggable ports, such as universal serial bus (USB) ports. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 802, the process 800 starts. At step 804, a controller, such as a USB controller and hot-pluggable ports, such as USB ports are kept isolated from an operating system of an information handling system (i.e., computer). The isolating can be electrical isolating.

At step 806, determining which devices to be enabled at the ports is performed. The determining can be based on device types, device codes, and descriptors that are returned by devices.

At step 808, a hash signature is created based on concatenated descriptors. The hash signature can be created using a private key. In certain implementations, the hash signature is created when a new device is plugged into a port, such as during a BIOS setup.

At step 810, the hash signature is saved. A hard disk drive on the information handling system (i.e., computer) can store the hash signature. The saved hash signature can be loaded into NVRAM when validating a device and can also be used by other information handling systems (i.e., computers).

At step 812, the controller is held in reset if no devices are installed on the ports. At step 814, the ports are held in reset if no devices are installed on the ports. Implementations provide for a SMI handler to take the USB controller and ports out of reset, such that the devices are held from the operating system until the devices are authenticated. At step 816, the process 800 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method of securing hot-pluggable ports of an information handling system comprising:
    isolating from an operating system of the information handling system a controller configured to the hot-pluggable ports;
    determining devices to be enabled at the hot-pluggable ports;
    creating a hash signature for the hot-pluggable ports;
    saving the hash signature for device verification;
    holding the controller and the hot-pluggable ports in reset if no devices are plugged at the hot-pluggable ports; and
    taking the controller and the hot-pluggable ports out of reset by a system management interrupt (SMI) handler when devices are authenticated.

2. The method of claim 1, wherein the controller is a universal serial bus (USB) controller, and the hot-pluggable ports are USB ports.

3. The method of claim 1, wherein the determining is based on one or more of the following: device type, class code, descriptors returned by devices.

4. The method of claim 1, wherein the creating the hash signature comprises concatenated descriptors returned by a device, and signed by a private key.

5. The method of claim 1, wherein the creating the hash signature is performed when a device is plugged into a hot-pluggable port to create the hash signature based on descriptors.

6. The method of claim 1, wherein the hash signature is used by other information handling systems.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        isolating from an operating system of the information handling system a controller configured to the hot-pluggable ports;
        determining devices to be enabled at the hot-pluggable ports;
        creating a hash signature for the hot-pluggable ports;
        saving the hash signature for device verification;
        holding the controller and the hot-pluggable ports in reset if no devices are plugged at the hot-pluggable ports; and
        taking the controller and the hot-pluggable ports out of reset by a system management interrupt (SMI) handler when devices are authenticated.

8. The system of claim 7, wherein the controller is a universal serial bus (USB) controller, and the hot-pluggable ports are USB ports.

9. The system of claim 7, wherein the determining is based on one or more of the following: device type, class code, descriptors returned by devices.

10. The system of claim 7, wherein the creating the hash signature comprises concatenated descriptors returned by a device, and signed by a private key.

11. The system of claim 7, wherein the creating the hash signature is performed when a device is plugged into a hot-pluggable port to create the hash signature based on descriptors.

12. The system of claim 7, wherein the hash signature is used by other information handling systems.

13. A non-transitory, computer-readable storage medium embodying computer program code, the computer program code comprising computer executable instructions configured for:
    isolating from an operating system of the information handling system a controller configured to the hot-pluggable ports;
    determining devices to be enabled at the hot-pluggable ports;
    creating a hash signature for the hot-pluggable ports;
    saving the hash signature for device verification;
    holding the controller and the hot-pluggable ports in reset if no devices are plugged at the hot-pluggable ports; and
    taking the controller and the hot-pluggable ports out of reset by a system management interrupt (SMI) handler when devices are authenticated.

14. The non-transitory, computer-readable storage medium of claim 13, wherein the controller is a universal serial bus (USB) controller, and the hot-pluggable ports are USB ports.

15. The non-transitory, computer-readable storage medium of claim 13, wherein the determining is based on one or more of the following: device type, class code, descriptors returned by devices.

16. The non-transitory, computer-readable storage medium of claim 13, wherein the creating the hash signature comprises concatenated descriptors returned by a device, and signed by a private key.

17. The non-transitory, computer-readable storage medium of claim 13, wherein the hash signature is used by other information handling systems.

* * * * *